US009960417B2

(12) United States Patent
Ceder et al.

(10) Patent No.: US 9,960,417 B2
(45) Date of Patent: May 1, 2018

(54) MOLYBDENUM OXIDES AND USES THEREOF

(71) Applicant: Massachusetts Institute of Technology, Cambridge, MA (US)

(72) Inventors: Gerbrand Ceder, Wellesley, MA (US); Jinhyuk Lee, Cambridge, MA (US); Sangtae Kim, Cambridge, MA (US); Xin Li, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days. days.

(21) Appl. No.: 14/044,814

(22) Filed: Oct. 2, 2013

(65) Prior Publication Data
US 2014/0141329 A1 May 22, 2014

Related U.S. Application Data

(60) Provisional application No. 61/708,963, filed on Oct. 2, 2012.

(51) Int. Cl.
H01M 4/36 (2006.01)
H01M 4/485 (2010.01)
H01M 4/525 (2010.01)
H01M 4/131 (2010.01)
H01M 4/62 (2006.01)

(52) U.S. Cl.
CPC .......... H01M 4/366 (2013.01); H01M 4/131 (2013.01); H01M 4/485 (2013.01); H01M 4/525 (2013.01); H01M 4/624 (2013.01); H01M 4/625 (2013.01)

(58) Field of Classification Search
None
See application file for complete search history.

(56) References Cited

U.S. PATENT DOCUMENTS

| 4,049,891 A | 9/1977 | Hong et al. |
| 4,302,518 A | 11/1981 | Goodenough et al. |
| 4,357,215 A | 11/1982 | Goodenough et al. |
| 4,507,371 A | 3/1985 | Thackeray et al. |

(Continued)

FOREIGN PATENT DOCUMENTS

| CN | 101997109 A | 3/2011 |
| JP | 2009-129587 A | 6/2009 |
| WO | WO-2014/055665 A2 | 4/2014 |

OTHER PUBLICATIONS

Capitelli, F. et al., New Monodisphosphate $Li_9Cr_3(P_2O_7)_3(PO_4)_2$: X-Ray Crystal Structure and Vibrational Spectroscopy, Z. Kristallographie, 222:521-526 (2007).

(Continued)

*Primary Examiner* — Sarah A. Slifka
*Assistant Examiner* — Haroon S. Sheikh
(74) *Attorney, Agent, or Firm* — Choate, Hall & Stewart, LLP; William R. Haulbrook; Alexander D. Augst

(57) ABSTRACT

The present disclosure describes, among other things, new layered molybdenum oxides for lithium ion battery cathodes from solid solutions of $Li_2MoO_3$ and $LiCrO_2$. These materials display high energy density, good rate capability, great safety against oxygen release at charged state due mostly to their low voltage. Therefore, these materials have properties desirable for lithium ion battery cathodes.

14 Claims, 8 Drawing Sheets

X-ray powder diffraction patterns of $Li(Li_{1-x/3}Mo_{0.2-2x/3}Cr_x)O_2$: (a) x=0 (b) x=0.1 (c) x=0.2 (d) x=0.3

(56) References Cited

U.S. PATENT DOCUMENTS

| | | | |
|---|---|---|---|
| 5,910,382 | A | 6/1999 | Goodenough et al. |
| 6,391,493 | B1 | 5/2002 | Goodenough et al. |
| 6,514,640 | B1 | 2/2003 | Armand et al. |
| 7,622,224 | B2 | 11/2009 | Si Larbi Jouanneau et al. |
| 8,399,130 | B2 | 3/2013 | Ceder et al. |
| 2003/0022063 | A1 | 1/2003 | Paulsen et al. |
| 2004/0091779 | A1 | 5/2004 | Kang et al. |
| 2005/0136331 | A1 | 6/2005 | Jouanneau-Si Larbi et al. |
| 2010/0143799 | A1* | 6/2010 | Park .............................. 429/219 |
| 2010/0143803 | A1* | 6/2010 | Park ...................... H01M 4/485 429/229 |
| 2010/0264381 | A1 | 10/2010 | Ceder et al. |
| 2011/0042609 | A1 | 2/2011 | Park et al. |
| 2011/0076556 | A1* | 3/2011 | Karthikeyan et al. ......... 429/188 |
| 2011/0111298 | A1* | 5/2011 | Lopez et al. .................. 429/221 |
| 2011/0294020 | A1 | 12/2011 | Kim et al. |
| 2012/0028134 | A1 | 2/2012 | Kim et al. |
| 2012/0045694 | A1* | 2/2012 | Park et al. .................... 429/220 |
| 2013/0273425 | A1 | 10/2013 | Ceder et al. |
| 2014/0099549 | A1 | 4/2014 | Ceder et al. |
| 2014/0246619 | A1 | 9/2014 | Hautier et al. |

OTHER PUBLICATIONS

Falah, C. et al., Crystal Structure and Cation Transport Properties of the Layered Monodiphosphates $Rb_6Bi_4(PO_4)_2(P_2O_7)_3$, Journal of Solid State Chemistry, 173:342-349 (2003).

International Search Report for PCT/US13/63094, 4 pages (dated Apr. 21, 2014).

Ji, F. et al., Hydrothermal Synthesis of $Li_9Fe_3(P_2O_7)_3(PO_4)_2$ Nanoparticles and Their Photocatalytic Properties under Visible-Light Illumination, Applied Materials & Interfaces, 2(6):1674-1678 (2010).

Kuang, Q. et al., Layered Monodiphosphate $Li_9V_3(P_2O_7)_3(PO_4)_2$: A Novel Cathode Material for Lithium-Ion Batteries, Electrochimica Acta, 56:2201-2205 (2011).

Kuang, Q. et al., Synthesis, Structure, Electronic, Ionic and Magnetic Properties of $Li_9V_3(P_2O_7)_3(PO_4)_2$ Cathode Material for Li-Ion Batteries, The Journal of Physical Chemistry C, 115:8422-8429 (2011).

Liu, X. et al., The Layered Monodiphosphate $Li_9Ga_3(P_2O_7)_3(PO_4)_2$ Refined from X-Ray Powder Data, Acta Crystallographrica, E62:i112-i113 (2006).

Poisson, S. et al., Crystal Structure and Cation Transport Properties of the Layered Monodiphosphates: $Li_9M_3(P_2O_7)_3(PO_4)_2$ (M = Al, Ga, Cr, Fe), Journal of Solid State Chemistry, 138:32-40 (1998).

Wang, H. et al., TEM Study of Electrochemical Cycling-Induced Damage and Disorder in $LiCoO_2$ Cathodes for Rechargeable Lithium Batteries, Journal of the Electrochemical Society, 146(2):473-480 (1999).

Xu, J. et al., Preparation and Electrochemical Properties of Cr-Doped $Li_9V_3(P_2O_7)_3(PO_4)_2$ as Cathode Materials for Lithium-Ion Batteries, Electrochimica Acta, vol. 56, Issue 18, 6562-6567 (2011).

Armstrong, A. R. et al., Demonstrating Oxygen Loss and Associated Structural Reorganization in the Lithium Battery Cathode $Li[Ni_{0.2}Li_{0.2}Mn_{0.6}]O_2$, J. Am. Chem. Soc., 128:8694-8698 (2006).

Choi, J. and Manthiram, A., Role of Chemical and Structural Stabilities on the Electrochemical Properties of Layered $LiNi_{1/3}Mn_{1/3}Co_{1/3}O_2$ Cathodes. Journal of the Electrochemical Society, 152(9):A1714-A1718 (2005).

Delmas, C. et al., On the behavior of the $Li_xNiO_2$ system: an electrochemical and structural overview, Journal of Power Sources 68:120-125 (1997).

Kang, K. et al., Electrodes with High Power and High Capacity for Rechargeable Lithium Batteries, Science, 311:977-980 (2006).

Lee, J. et al., Unlocking the Potential of Cation-Disordered Oxides for Rechargeable Lithium Batteries, Science, 343:519-522 (2014).

Lyu, Y. et al., Atomic insight into electrochemical inactivity of lithium chromate ($LiCrO_2$): Irreversible migration of chromium into lithium layers in surface regions, Journal of Power Sources, 273:1218-1225 (2015).

Ohzuku, T. and Makimura, Y., Layered Lithium Insertion Material of $LiNi_{frax;1;2}Mn_{frax;1;2}O_2$: A Possible Alternative to $LiCoO_2$ for Advanced Lithium-Ion Batteries, Chemistry Letters, 30:744:745 (2001).

Park, K-S. et al., $LiFeO_2$-Incorporated $Li_2MoO_3$ as a Cathode Additive for Lithium-Ion Battery Safety, Chem. Mater., 24:2673-2683 (2012).

Thackeray, J. M. et al., $Li_2MnO_3$-stabilized $LiMO_2$ (M = Mn, Ni, Co) electrodes for lithium-ion batteries, J. Mater. Chem., 17(30):3112-3125 (2007).

Whittingham, M. S., Electrical Energy Storage and Intercalation Chemistry, Science, 192:1126-1127 (1976).

Whittingham, M. S., Lithium Batteries and Cathode Materials, Chemcial Reviews, 104(10):4271-4301 (2004).

Zhang, X. et al., Minimization of the cation mixing in $Li_{1+x}(NMC)_{1-x}O_2$ as cathode material, Journal of Power Sources, 195:1292-1301 (2010).

James, A. C. W. P. and Goodenough, J. B., Structure and Bonding in $Li_2MoO_3$ and $Li_{2-x}MoO_3$ ($0 \le x \le 1.7$), Journal of Solid State Chemistry 76:87-96 (1988).

Jones, C. D. W. et al., Structure and electrochemistry of $Li_xCr_yCo_{1-y}O_2$, Solid State Ionics, 68:65-69 (1994).

Yu, X.. et al., Understanding the Rate Capability of High-Energy-Density Li-Rich Layers Li1.2Ni0.15Co0.1Mn0.55O2 Cathode Materials, Advanced Energy Materials, 8 pages, (2013).

Zhang, L. et al., Novel Layered Li—Cr—Ti—O Cathode Materials Related to the $LiCrO_2$—$Li_2TiO_3$ Solid Solution, Journal of the Electrochemical Society, 150(5):A601-A607 (2003).

* cited by examiner

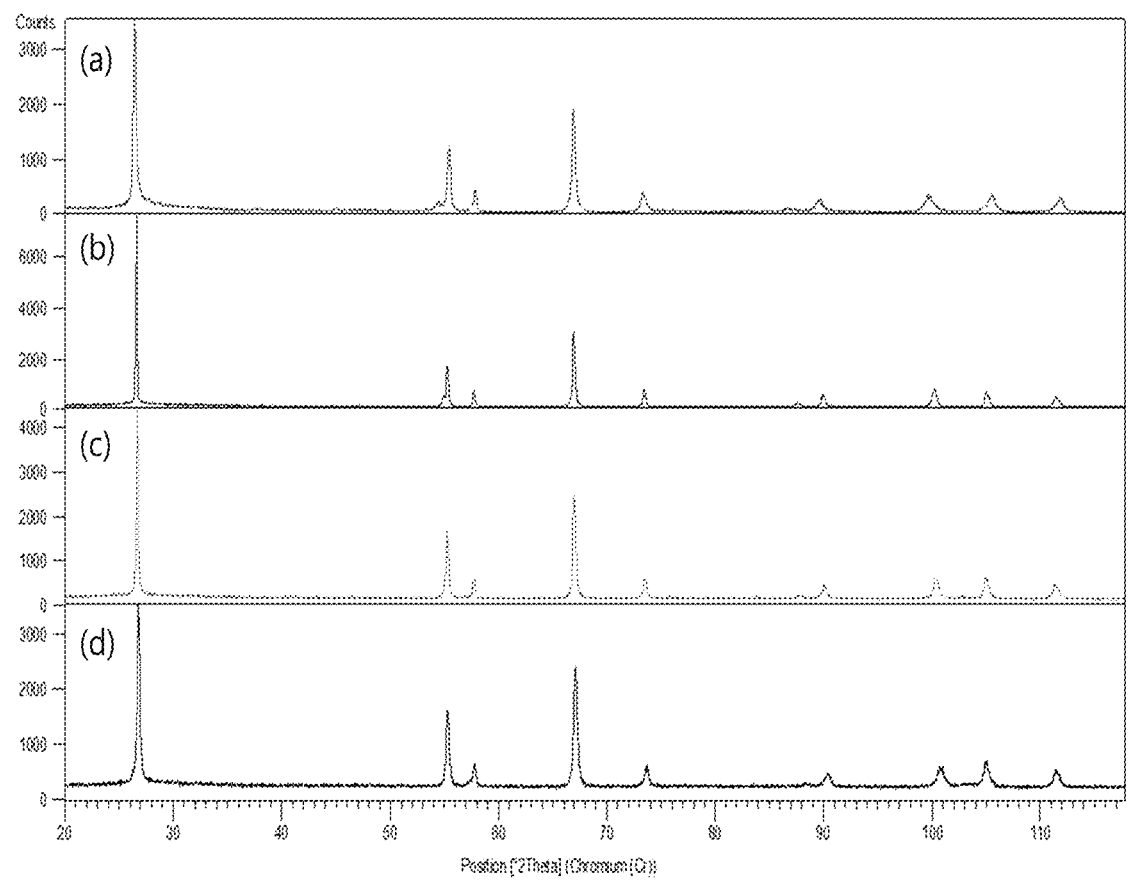
Figure 1. X-ray powder diffraction patterns of $Li(Li_{(1-x)/3}Mo_{(2-2x)/3}Cr_x)O_2$: (a) x=0 (b) x=0.1 (c) x=0.2 (d) x=0.3

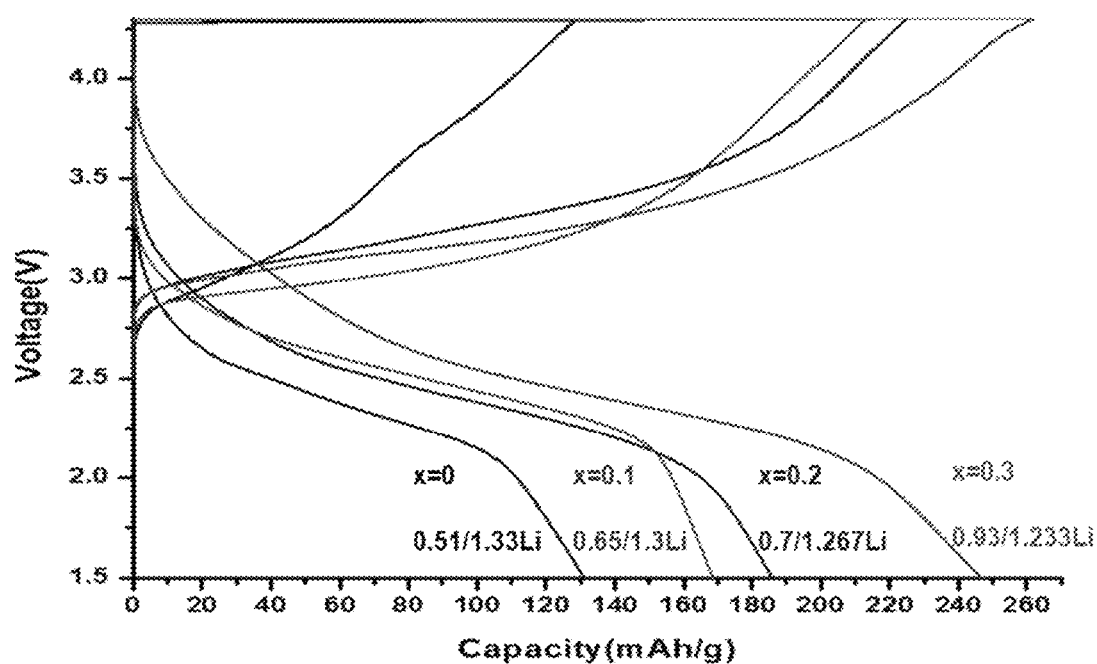
Figure 2. The 1st cycle charge/discharge curves for $Li(Li_{(1-x)/3}Mo_{(2-2x)/3}Cr_x)O_2$ (x=0, 0.1, 0.2, 0.3). All cells were cycled between 1.5-4.3V at C/20 rate (1C=339 mA/g for x=0, 336 mA/g for x=0.1, 332 mA/g for x=0.2, 327 mA/g for x=0.3)

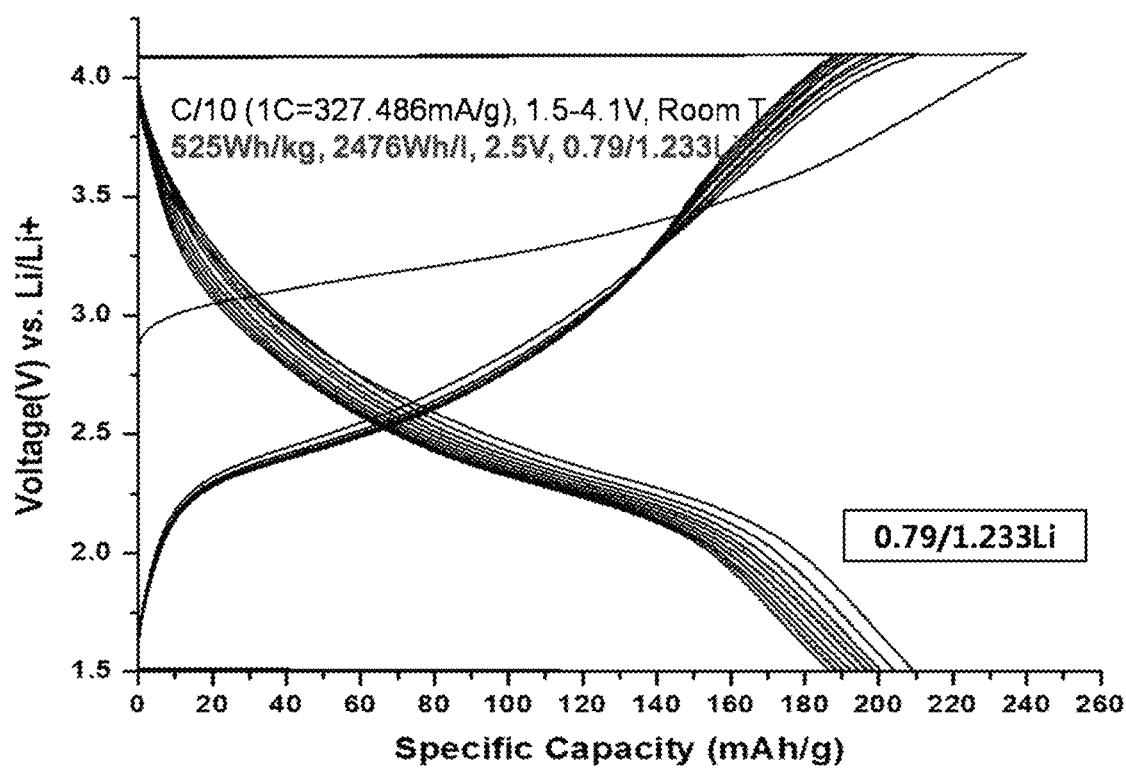
Figure 3. Galvanostatic charge/discharge profile of the planetary ball milled $Li(Li_{0.233}Mo_{0.467}Cr_{0.3})O_2$. The cell was cycled between 1.5V and 4.1V at C/10 rate at room temperature.

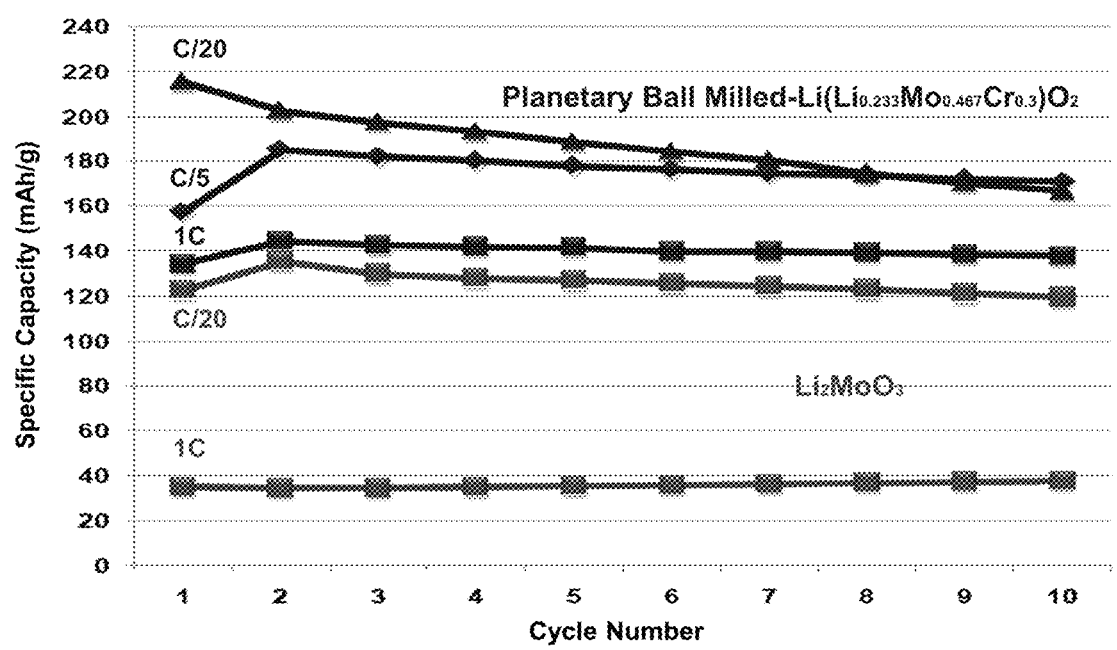
Figure 4. Discharge capacity vs. cycle number plots for the planetary ball milled Li(Li$_{0.233}$Mo$_{0.467}$Cr$_{0.3}$)O$_2$ and Li$_2$MoO$_3$. The tests were performed between 1.5 V and 4.0 V at various rates.

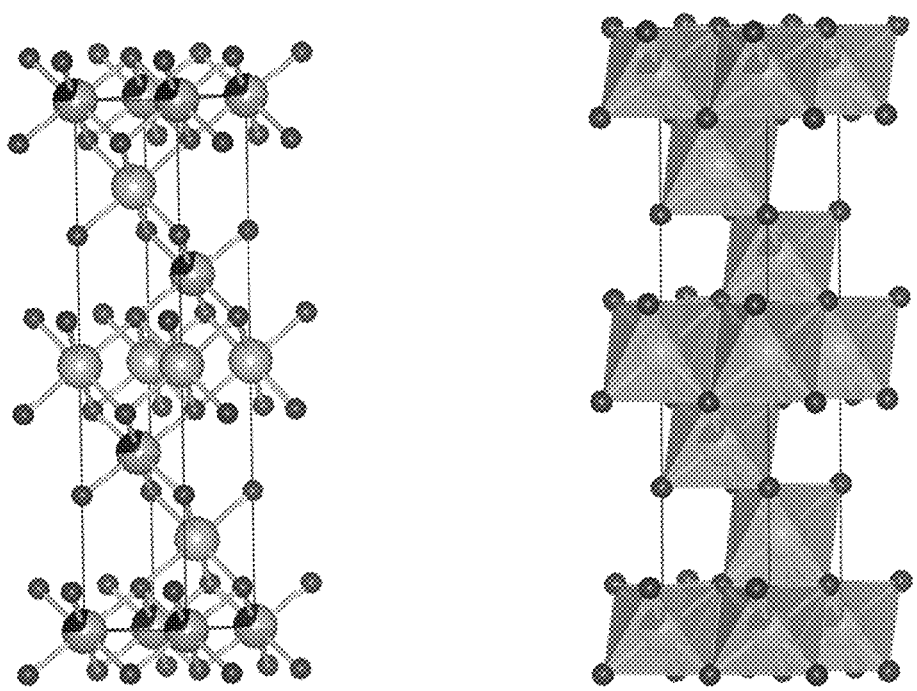
Figure 5. Crystal Structure of $Li(Li_{(1-x)/3}Mo_{(2-2x)/3}Cr_x)O_2$: Left-Ball & Stick view, Right-Polyhedra view; from Rietveld refinement of X-ray powder diffraction D pattern of x=0.3

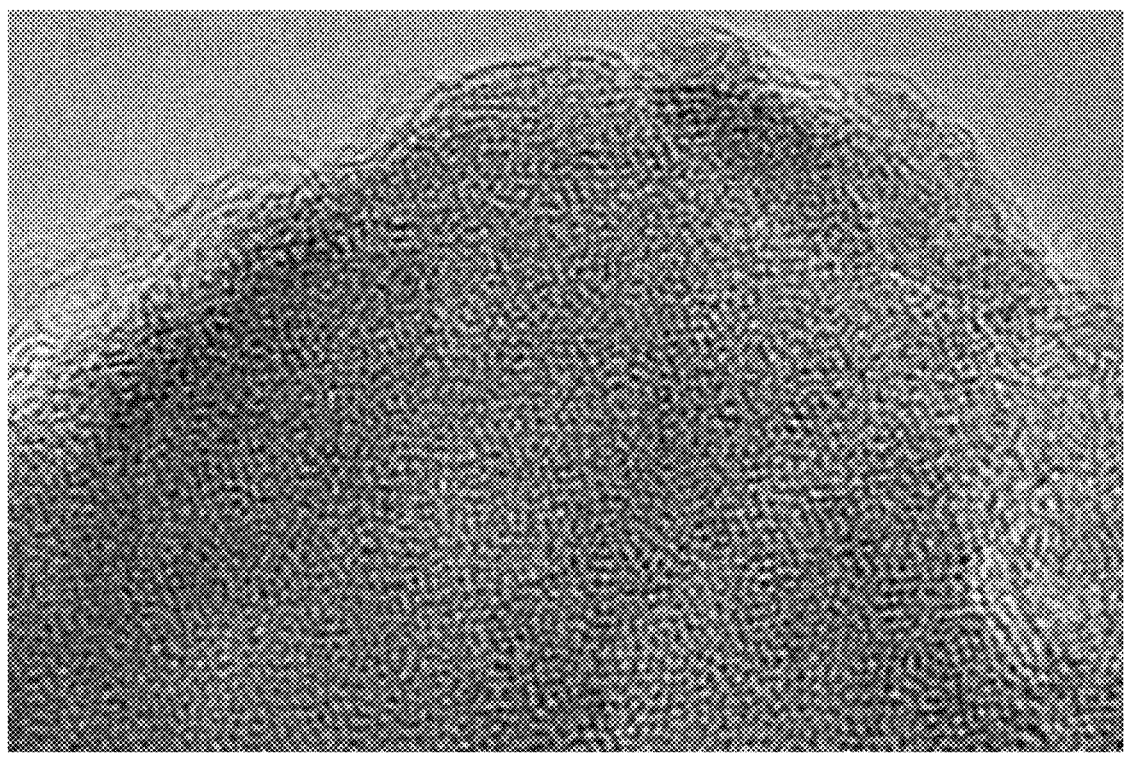
Figure 6. A TEM image of the carbon coated Li(Li$_{0.233}$Mo$_{0.467}$Cr$_{0.3}$)O$_2$. We see amorphous carbon layers at the surface

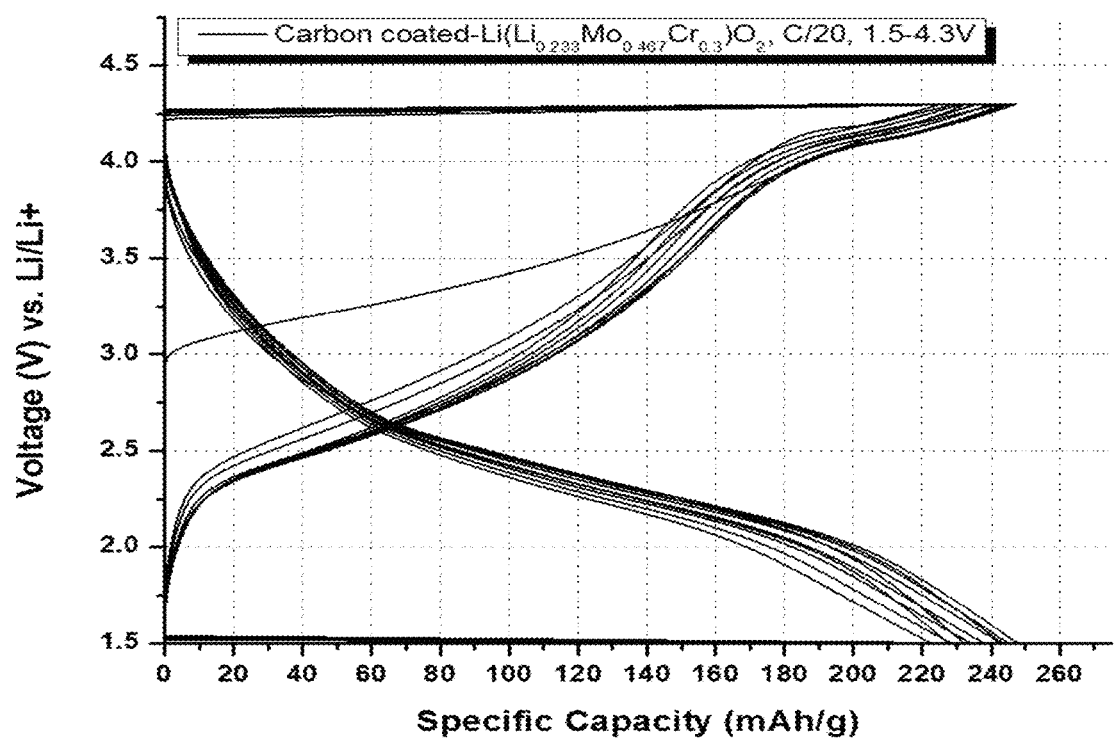
Figure 7. The voltage profile of carbon coated Li(Li0.233Mo0.467Cr0.3)O2 when it is cycled between 1.5-4.3V at the C/20 rate

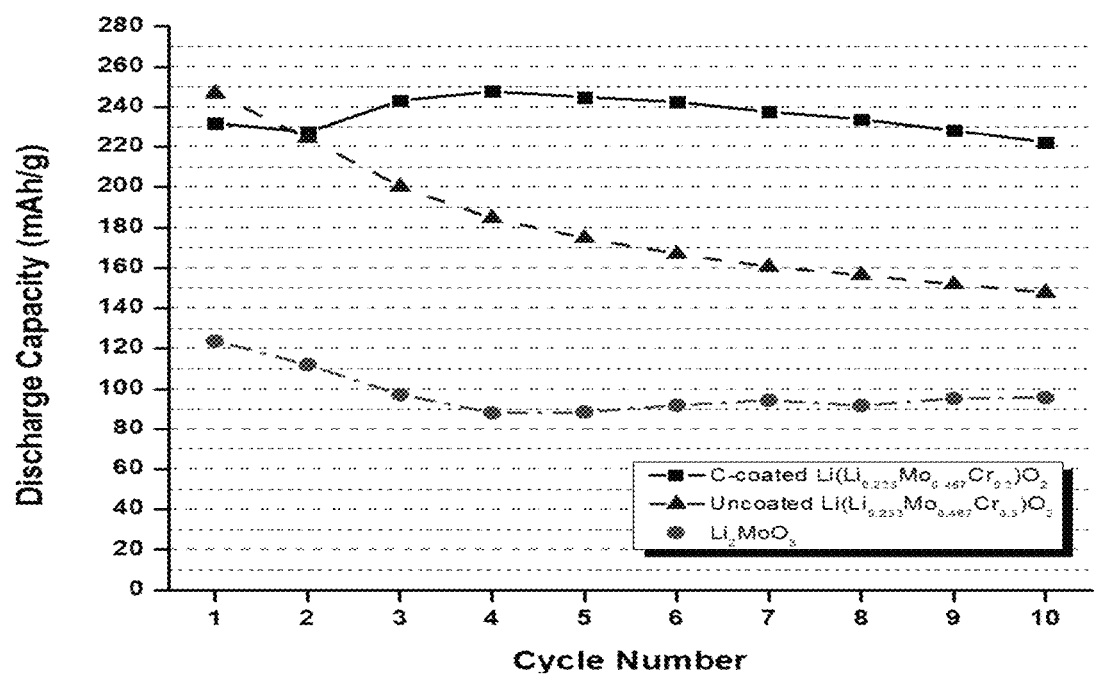
Figure 8. Discharge capacity vs. cycle number for $Li_2MoO_3$, $Li(Li_{0.233}Mo_{0.467}Cr_{0.3})O_2$, and C- coated $Li(Li_{0.233}Mo_{0.467}Cr_{0.3})O_2$ when they were cycled between 1.5-4.3V at the C/20 rate.

MOLYBDENUM OXIDES AND USES THEREOF

CROSS REFERENCE TO RELATED APPLICATIONS

The present application claims priority to U.S. provisional patent application No. 61/708,963, filed Oct. 2, 2012, the entire contents of which are hereby incorporated by reference herein.

BACKGROUND

Today, three main types of insertion materials are being studied as lithium ion battery cathodes, the so-called nickel manganese cobalt-based layered oxides, nickel manganese-based spinels, and iron-based olivines. While each class has its own strengths, none are ideal. Nickel manganese cobalt-based layered oxides offer high energy density, but have questionable safety and poor rate capability. Manganese-based spinels, on the other hand, have good rate capability but low specific capacity, low energy density, and poor cycle life at high temperature. Lastly, iron-based olivines are cheap, safe, and show good cycle life, but have low gravimetric and volumetric energy density. Therefore, searching for novel and improved cathode materials is important for the lithium ion battery industry.

BRIEF DESCRIPTION OF THE DRAWINGS

FIG. 1 depicts X-ray powder diffraction patterns of $Li(Li_{(1-x)/3}Mo_{(2-2x)/3}Cr_x)O_2$.

FIG. 2 depicts the 1st cycle charge/discharge curves for $Li(Li_{(1-x)/3}Mo_{(2-2x)/3}Cr_x)O_2$.

FIG. 3 depicts galvanostatic charge/discharge profile of planetary ball milled $Li(Li_{0.233}Mo_{0.467}Cr_{0.3})O_2$.

FIG. 4 depicts discharge capacity vs. cycle number plots for planetary ball milled $Li(Li_{0.233}Mo_{0.467}Cr_{0.3})O_2$ and $Li_2MoO_3$.

FIG. 5 depicts a crystal structure of $Li(Li_{(1-x)/3}Mo_{(2-2x)/3}Cr_x)O_2$.

FIG. 6 depicts a TEM image of the carbon coated $Li(Li_{0.233}Mo_{0.467}Cr_{0.3})O_2$.

FIG. 7 depicts a voltage profile of carbon coated $Li(Li_{0.233}Mo_{0.467}Cr_{0.3})O_2$.

FIG. 8 depicts discharge capacity vs. cycle number for $Li_2MoO_3$, $Li(Li_{0.233}Mo_{0.467}Cr_{0.3})O_2$, and C-coated $Li(Li_{0.233}Mo_{0.467}Cr_{0.3})O_2$.

DETAILED DESCRIPTION OF CERTAIN EMBODIMENTS

The present disclosure describes, among other things, new layered molybdenum oxides for lithium ion battery cathodes from solid solutions of $Li_2MoO_3$ and $LiCrO_2$. These materials display high energy density, good rate capability, great safety against oxygen release at charged state due mostly to their low voltage. Therefore, these materials have properties desirable for lithium ion battery cathodes.

I. Compounds

The present disclosure encompasses compounds of the formula:

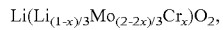

$$Li(Li_{(1-x)/3}Mo_{(2-2x)/3}Cr_x)O_2,$$

wherein $0<x\leq0.5$. In some embodiments, x=0.1, 0.2, 0.3, 0.4. or 0.5. The terms "compound" and "solid solution" are used interchangeably in the present disclosure.

It will be appreciated that in addition to the compositions described herein, the present disclosure encompasses the use of dopants, additives, and/or the presence of impurities in any of the described compositions and uses thereof. In some embodiments, one or more dopants are selected from the group consisting of nickel, cobalt, manganese, iron, titanium, copper, silver, magnesium, calcium, strontium, zinc, aluminum, chromium, gallium, germanium, tin, tantalum, niobium, zirconium, fluorine, sulfur, yttrium, tungsten, silicon, and lead. This is a non-limiting list; other dopants, additives, or impurities are possible. In some embodiments, a dopant, additive, or impurity can be mixed into these compounds to improve properties such as rate, safety, etc, without substantially modifying the chemical nature of the compound.

In addition, during the synthesis of compounds described herein, some loss of lithium may occur, resulting in a substoichiometric amount of lithium relative to the other elements in formula $Li(Li_{(1-x)/3}Mo_{(2-2x)/3}Cr_x)O_2$. In some embodiments, such compounds deficient in lithium are of formula $Li_{((4-x)/3)-w}(Mo_{(2-2x)/3}Cr_x)O_2$, wherein $0\leq w\leq 0.2$ and w represents a lithium deficiency. The present invention encompasses such lithium deficient compounds, materials comprising such compounds, and uses thereof.

II. Experimental Procedure i. Solid Solutions

To prepare $Li(Li_{(1-x)/3}Mo_{(2-2x)/3}Cr_x)O_2$, $Li_2CO_3$, $MoO_2$, and $Cr_3(OH)_2(OOCCH_3)_7$ were used as precursors. A 5% excess of $Li_2CO_3$ from the stoichiometric amount needed to synthesize $Li(Li_{(1-x)/3}Mo_{(2-2x)/3}Cr_x)O_2$ (x=0.1, 0.2, 0.3, 0.4) was used to compensate for possible Li loss during high temperature solid state reaction. The precursors were dispersed into acetone and ball milled for 24 hours and dried overnight to prepare the mixture of precursors. The mixture was fired at 1050° C. for 15 hours under Ar gas, and manually ground to obtain the final products. For the comparison, $Li_2MoO_3$ was synthesized using $Li_2CO_3$ and $MoO_2$ precursors. Again, a 5% excess of $Li_2CO_3$ from the stoichiometric amount was used to compensate for Li loss during the high temperature firing. The mixture of $Li_2CO_3$ and $MoO_2$ for $Li_2MoO_3$ was prepared by using the same ball milling method and fired at 750° C. for 6 hours under a mixture of $H_2$ (3%) and Ar (97%) gas.

For structure characterization, a Cr-source Rigaku X-ray diffractometer was utilized. For electrochemical tests, Swagelok cells were assembled under Ar atmosphere in a glove box. The cathode was composed of 80 wt % of $Li(Li_{(1-x)/3}Mo_{(2-2x)/3}Cr_x)O_2$ (x=0, 0.1, 0.2, 0.3, 0.4), 15 wt % of carbon black, and 5 wt % of PTFE. For some samples, instead of hand mixing, planetary ball milling at 500 rpm for 2 hours was adopted to mix the active material and carbon black to decrease the particle size of the active material. 1 M of $LiPF_6$ in 1:1 ratio of EC:DMC solution was used as an electrolyte, and Li metal foil was used as the anode.

ii. Carbon Coating

Sucrose ($C_{12}H_{22}O_{11}$) was used as a carbon precursor, and it was mixed in a planetary ball mill with $Li(Li_{(1-x)/3}Mo_{(2-2x)/3}Cr_x)O_2$ (x=0 to 0.3) in weight ratios between 90:10 and 70:30 of active material to sucrose. Then, the mixture was annealed between 400° C. to 800° C. for 2 to 6 hours under Ar gas. The annealed compound was ground manually with a mortar and pestle and mixed with carbon black and PTFE binder for the electrode preparation.

III. Experimental Results

FIG. 1 shows the XRD patterns of $Li(Li_{(1-x)/3}Mo_{(2-2x)/3}Cr_x)O_2$ (x=0, 0.1, 0.2, 0.3). The solid solutions between $Li_2MoO_3$ and $LiCrO_2$ have R-3m space group which both $Li_2MoO_3$ and $LiCrO_2$ share. X-ray coordinates for selected compounds are provided in Appendices A and B.

FIG. 2 shows the 1$^{st}$ cycle galvanostatic charge/discharge profiles of $Li(Li_{(1-x)/3}Mo_{(2-2x)/3}Cr_x)O_2$ (x=0, 0.1, 0.2, 0.3) when the materials were cycled between 1.5 V and 4.3 V at C/20 rate (1C=339 mA/g for x=0, 336 mA/g for x=0.1, 332 mA/g for x=0.2, 327 mA/g for x=0.3). The initial charge and discharge capacity greatly increases as x increases from 0 to 0.3. Notably, the x=0.3 compound shows very high initial discharge capacity around 240 mAh/g, which is approximately twice the capacity of pure $Li_2MoO_3$ (x=0). Kobayashi et al. (J. Power Sources, 81-82, 524-529 (1999)) tested the electrochemical properties of $Li_2MoO_3$ (x=0), and obtained a specific capacity about 100 mAh/g at C/20 rate. Comparing the performance of $Li_2MoO_3$ from Kobayashi and $Li(Li_{(1-x)/3}Mo_{(2-2x)/3}Cr_x)O_2$ (x=0.1, 0.2, 0.3), it is clear that $Li(Li_{(1-x)/3}Mo_{(2-2x)/3}Cr_x)O_2$ (x=0.1, 0.2, 0.3) performs much better than $Li_2MoO_3$ both in specific capacity and energy density.

FIG. 3 shows the galvanostatic charge/discharge profile of $Li(Li_{0.233}Mo_{0.467}Cr_{0.3})O_2$ when milled with carbon in a planetary ball mill, and cycled between 1.5 V and 4.1 V at C/10 (1C=327 mA/g). The profile shows that this material is using 64% of its theoretical capacity (327 mAh/g) stably. Integrating the area of the 1$^{st}$ discharge curve reveals that this material delivers a gravimetric energy density of 525 Wh/kg, which is as high as that of $LiFePO_4$ (560 Wh/kg) and higher than that of $LiMn_2O_4$ (400 Wh/kg) at the decent rate of C/10. The gravimetric energy density is converted to volumetric energy density by multiplying the density of the material to the gravimetric energy density, yielding 2140 Wh/l for the planetary ball milled $Li(Li_{0.233}Mo_{0.467}Cr_{0.3})O_2$, which is higher than that of both $LiFePO_4$ (2000 Wh/l) and $LiMn_2O_4$ (1720 Wh/l).

FIG. 4 shows the discharge capacity vs. cycle number plots for both $Li_2MoO_3$ and planetary ball milled $Li(Li_{0.233}Mo_{0.467}Cr_{0.3})O_2$ when they were cycled between 1.5 V and 4.0 V at various rates. Comparing the discharge capacity between the two materials, planetary ball milled $Li(Li_{0.233}Mo_{0.467}Cr_{0.3})O_2$ shows much better electrochemical behavior than un-doped $Li_2MoO_3$. The planetary ball milled $Li(Li_{0.233}Mo_{0.467}Cr_{0.3})O_2$ shows higher specific capacity for every charge/discharge rate as well negligible capacity loss even at higher rates.

Carbon coating was found to improve the cycling performance of $Li(Li_{0.233}Mo_{0.467}Cr_{0.3})O_2$, especially when carbon coated $Li(Li_{0.233}Mo_{0.467}Cr_{0.3})O_2$ was cycled between 1.5-4.3V vs. 1.5-4.0V. Un-coated $Li(Li_{0.233}Mo_{0.467}Cr_{0.3})O_2$ has shown observable capacity fading while carbon coated $Li(Li_{0.233}Mo_{0.467}Cr_{0.3})O_2$ shows negligible capacity fading as well as higher discharge capacity upon cycling.

In addition to carbon, other coatings may also be used in accordance with the present invention. For example, by way of nonlimiting example, a coating may be selected from a member consisting of MgO, $Al_2O_3$, $SiO_2$, $TiO_2$, ZnO, $SnO_2$, $ZrO_2$, $Li_2O$-$2B_2O_3$ glass, phosphates, and combinations thereof.

FIG. 7 shows the voltage profile of the carbon coated $Li(Li_{0.233}Mo_{0.467}Cr_{0.3})O_2$ when it was cycled between 1.5-4.3V at C/20 rate. Very high specific capacity of 248 mAh/g is seen at the 4$^{th}$ discharge, and 222 mAh/g at the 10$^{th}$ discharge. Integrating the area of the 4$^{th}$ discharge voltage profile reveals that this carbon coated $Li(Li_{0.233}Mo_{0.467}Cr_{0.3})O_2$ can deliver high specific energy density of 603 Wh/kg (2850 Wh/l) which is a larger value than that of $LiCoO_2$ (540 Wh/kg, 2640 Wh/l), $LiFePO_4$ (560 Wh/kg, 2000 Wh/l), or $LiMn_2O_4$ (400 Wh/kg, 1720 Wh/l).

FIG. 8 shows the discharge capacity vs. cycle number which summarizes the effect of Cr-doping and the effect of carbon coating to the Cr-doped Mo oxide. While not wishing to be bound by any particular theory, Applicants suggest that carbon coating is protecting transition metal dissolution at highly delithiated states as well as improving kinetics by decreasing the charge transfer resistance of $Li(Li_{0.233}Mo_{0.467}Cr_{0.3})O_2$.

XRD data

| No. | Pos. [°2 Th.] | d-spacing [Å] | Height [cts] |
|---|---|---|---|
| Li(Li0.233Mo0.467Cr0.3)O2 | | | |
| 1 | 26.79744 | 4.94066 | 2204.231 |
| 2 | 26.84409 | 4.94064 | 1098.915 |
| 3 | 55.29761 | 2.46714 | 78.1554 |
| 4 | 55.31062 | 2.46661 | 934.7767 |
| 5 | 55.4001 | 2.46714 | 38.89364 |
| 6 | 55.41313 | 2.4666 | 465.2796 |
| 7 | 57.77902 | 2.36975 | 260.5747 |
| 8 | 57.88697 | 2.36975 | 129.6544 |
| 9 | 67.08288 | 2.07203 | 1602.63 |
| 10 | 67.21258 | 2.07203 | 797.845 |
| 11 | 73.64794 | 1.91018 | 235.7865 |
| 12 | 73.79443 | 1.91017 | 117.2686 |
| 13 | 88.28115 | 1.64395 | 28.36495 |
| 14 | 88.47106 | 1.64394 | 14.115 |
| 15 | 90.3529 | 1.61414 | 158.0834 |
| 16 | 90.54982 | 1.61414 | 78.68771 |
| 17 | 100.7205 | 1.48672 | 273.6597 |
| 18 | 100.9569 | 1.48672 | 136.4141 |
| 19 | 104.972 | 1.44336 | 303.3892 |
| 20 | 105.2271 | 1.44336 | 151.3094 |
| 21 | 111.487 | 1.38517 | 175.4971 |
| 22 | 111.7747 | 1.38517 | 87.563 |
| 23 | 128.1597 | 1.27293 | 24.88489 |
| 24 | 128.5636 | 1.27293 | 12.43417 |
| Li(Li0.3Mo0.6Cr0.1)O2 | | | |
| 1 | 26.59898 | 4.97685 | 5394(216) |
| 2 | 26.64533 | 4.97682 | 2687(114) |
| 3 | 54.89956 | 2.48363 | 213(62) |
| 4 | 55.00125 | 2.48362 | 106(25) |
| 5 | 55.29517 | 2.46724 | 1454(119) |
| 6 | 55.39772 | 2.46724 | 723(74) |
| 7 | 57.73351 | 2.37146 | 489(90) |
| 8 | 57.84142 | 2.37145 | 243(54) |
| 9 | 66.92961 | 2.07622 | 2324(174) |
| 10 | 67.059 | 2.07622 | 1156(102) |
| 11 | 73.42109 | 1.91524 | 476(103) |
| 12 | 73.56707 | 1.91524 | 237(64) |
| 13 | 87.57216 | 1.65453 | 81(82) |
| 14 | 87.75984 | 1.65452 | 40(56) |
| 15 | 89.93337 | 1.62005 | 357(106) |
| 16 | 90.12896 | 1.62004 | 178(69) |
| 17 | 100.1668 | 1.49271 | 591(128) |
| 18 | 100.401 | 1.49271 | 295(81) |
| 19 | 105.0075 | 1.44302 | 506(121) |
| 20 | 105.2629 | 1.44301 | 252(78) |
| 21 | 111.4442 | 1.38552 | 365(117) |
| 22 | 111.7318 | 1.38552 | 182(77) |
| Li(Li0.267Mo0.533Cr0.2)O2 | | | |
| 1 | 26.67623 | 4.9627 | 2934(196) |
| 2 | 26.72266 | 4.96268 | 1462(102) |
| 3 | 55.03277 | 2.47808 | 117(50) |
| 4 | 55.13469 | 2.47808 | 58(15) |

-continued

| No. | Pos. [°2 Th.] | d-spacing [Å] | Height [cts] |
|---|---|---|---|
| 5 | 55.29687 | 2.46717 | 1108(127) |
| 6 | 55.39936 | 2.46717 | 551(78) |
| 7 | 57.74431 | 2.37105 | 350(107) |
| 8 | 57.85217 | 2.37105 | 174(64) |
| 9 | 66.97249 | 2.07505 | 1844(180) |
| 10 | 67.10192 | 2.07504 | 918(105) |
| 11 | 73.48546 | 1.9138 | 317(116) |
| 12 | 73.63152 | 1.9138 | 158(72) |
| 13 | 87.79231 | 1.65122 | 44(100) |
| 14 | 87.98062 | 1.65122 | 22(52) |
| 15 | 90.05252 | 1.61836 | 224(117) |
| 16 | 90.24842 | 1.61836 | 111(77) |
| 17 | 100.3231 | 1.49101 | 376(144) |
| 18 | 100.5578 | 1.49101 | 187(92) |
| 19 | 104.9573 | 1.4435 | 386(147) |
| 20 | 105.2123 | 1.4435 | 192(91) |
| 21 | 111.4136 | 1.38578 | 256(142) |
| 22 | 111.7008 | 1.38577 | 128(91) |
| 23 | 127.391 | 1.27712 | 48(145) |
| 24 | 127.7881 | 1.27712 | 24(81) |

Acknowledgements

This work was supported by Bosch and Umicore.

What is claimed is:

1. An electrochemically active compound of the formula $Li(Li_{(1-x)/3}Mo_{(2-2x)/3}Cr_x)O_2$, wherein $0.25 \leq x \leq 0.35$, wherein the compound is characterized in that it allows reversible charging and discharging.

2. The compound of claim 1, wherein x is 0.3.

3. An electrode material comprising at least one compound of claim 1.

4. A solid form of a compound of claim 2, having an X-ray powder diffraction pattern as shown in FIG. 1(d).

5. A coated electrode material comprising a compound of claim 1.

6. The coated electrode material of claim 5 having a coating comprising a member selected from the group consisting of carbon, MgO, $Al_2O_3$, $SiO_2$, $TiO_2$, ZnO, $SnO_2$, $ZrO_2$, $Li_2O\text{-}2B_2O_3$ glass, phosphates, and combinations thereof.

7. The coated electrode material of claim 6, wherein the phosphate is selected from the group consisting of $AlPO_4$, $Li_4P_2O_7$, and $Li_3PO_4$.

8. The coated electrode material of claim 6, wherein the weight ratio of carbon to total MgO, $Al_2O_3$, $SiO_2$, $TiO_2$, ZnO, $SnO_2$, $ZrO_2$, $Li_2O\text{-}2B_2O_3$, and phosphates is $y:1-y$, wherein $0 < y \leq 0.2$.

9. The coated electrode material of claim 6, wherein the coating thickness is no greater than 10 nm.

10. An electrode composition comprising carbon black, a binder, and the coated electrode material of claim 5.

11. The electrode composition of claim 10, wherein the coating of the electrode material prevents or lessens electrode transition metal dissolution.

12. The electrode composition of claim 10, wherein the binder is PTFE.

13. The electrode composition of claim 10, wherein the weight ratio of coated electrode material to carbon black to binder is $v:z:1-v-z$, wherein $0.3 \leq v \leq 1$, $0 \leq z \leq 0.7$, and $0.3 \leq v+z < 1$.

14. A lithium battery comprising the coated electrode material of claim 5.

* * * * *